(12) United States Patent
Petrak

(10) Patent No.: US 7,819,042 B2
(45) Date of Patent: Oct. 26, 2010

(54) SYSTEM AND METHOD FOR TENSIONING AN EMERGENCY BRAKE SYSTEM

(76) Inventor: Gregory H. Petrak, 16488 W. 55th Dr., Golden, CO (US) 80403

( * ) Notice: Subject to any disclaimer, the term of this patent is extended or adjusted under 35 U.S.C. 154(b) by 17 days.

(21) Appl. No.: 12/184,175

(22) Filed: Jul. 31, 2008

(65) Prior Publication Data

US 2009/0031868 A1    Feb. 5, 2009

Related U.S. Application Data

(60) Provisional application No. 60/953,185, filed on Jul. 31, 2007.

(51) Int. Cl.
*B25B 29/00* (2006.01)
*F16C 1/22* (2006.01)

(52) U.S. Cl. .................. 81/57.38; 74/501.5 R
(58) Field of Classification Search ............... 81/57.38, 81/177.85; 74/501.5 R
See application file for complete search history.

(56) References Cited

U.S. PATENT DOCUMENTS

| | | | |
|---|---|---|---|
| 2,821,091 A | 1/1958 | Benner | |
| 3,237,977 A | 3/1966 | Batchelder | |
| 3,513,719 A | 5/1970 | Tschanz | |
| 3,643,198 A | 2/1972 | Economu | |
| 3,661,090 A | 5/1972 | Martin et al. | |
| 3,937,295 A | 2/1976 | Wright | |
| 3,969,964 A * | 7/1976 | George et al. | 81/310 |
| 4,020,713 A | 5/1977 | Cantley et al. | |
| 4,057,135 A | 11/1977 | Mori | |
| 4,174,099 A | 11/1979 | Yamasaki | |
| 4,227,594 A | 10/1980 | Kluger | |
| 4,256,205 A | 3/1981 | Hamar | |
| 4,271,718 A | 6/1981 | Bopp et al. | |
| 4,347,993 A | 9/1982 | Leonard | |
| 4,374,597 A | 2/1983 | Mochida | |
| 4,378,713 A | 4/1983 | Haskell et al. | |
| 4,380,181 A | 4/1983 | Bunyan | |
| 4,407,167 A | 10/1983 | Koukal et al. | |
| 4,412,458 A | 11/1983 | Derringer | |
| 4,438,901 A * | 3/1984 | Reneau et al. | 254/29 A |
| 4,539,872 A * | 9/1985 | Bochman, Jr. | 81/57.37 |
| 4,543,849 A | 10/1985 | Yamamoto et al. | |
| 4,569,112 A | 2/1986 | Dussault | |
| 4,624,155 A | 11/1986 | Wing | |

(Continued)

FOREIGN PATENT DOCUMENTS

DE    4109887    10/1992

(Continued)

OTHER PUBLICATIONS

Bolz et al., Handbook of tables for Applied Engineering Science, 2nd Edition, CRC Press, pp. 103-115, 1976.

(Continued)

*Primary Examiner*—David B Thomas
(74) *Attorney, Agent, or Firm*—Dorsey & Whitney LLP

(57) ABSTRACT

A brake tensioning system and method are described herein for use on vehicles. The system includes a tool, and the method includes the use of the tool to effectuate tensioning of a brake system conveniently, accurately, and repeatably.

11 Claims, 11 Drawing Sheets

U.S. PATENT DOCUMENTS

| | | | |
|---|---|---|---|
| 4,658,668 A | 4/1987 | Stocker | |
| 4,838,109 A | 6/1989 | Stewart | |
| 4,887,705 A | 12/1989 | Solano et al. | |
| 5,016,490 A | 5/1991 | Jaksic | |
| 5,074,175 A * | 12/1991 | Earle | 81/302 |
| 5,080,434 A | 1/1992 | Locher | |
| 5,086,662 A | 2/1992 | Tayon et al. | |
| 5,144,856 A | 9/1992 | Roca | |
| 5,203,068 A | 4/1993 | Siring | |
| 5,211,071 A | 5/1993 | Hedstrom | |
| 5,235,870 A | 8/1993 | Hedstrom | |
| 5,386,887 A | 2/1995 | Hilgert et al. | |
| 5,482,085 A | 1/1996 | Wasson | |
| 5,590,744 A | 1/1997 | Belmond | |
| 5,615,575 A | 4/1997 | Goodwin | |
| 5,662,004 A | 9/1997 | Osborn et al. | |
| 5,802,929 A | 9/1998 | Furukawa et al. | |
| 5,809,917 A | 9/1998 | McGowan et al. | |
| 5,813,290 A | 9/1998 | Takahashi et al. | |
| 5,816,109 A | 10/1998 | Dege | |
| 5,890,406 A | 4/1999 | Thorn | |
| 5,910,194 A | 6/1999 | Cho | |
| 5,983,745 A | 11/1999 | Petrak | |
| 6,328,138 B1 | 12/2001 | Takizawa | |
| 6,575,270 B2 * | 6/2003 | Farenden | 188/2 D |
| 6,799,473 B2 | 10/2004 | Adrian | |
| 7,011,188 B2 | 3/2006 | Scheuring et al. | |
| 7,331,254 B2 | 2/2008 | Petrak | |
| 7,331,255 B2 | 2/2008 | Petrak | |
| 7,464,608 B2 | 12/2008 | Revelis et al. | |
| 2002/0011129 A1 | 1/2002 | Petrak | |
| 2002/0070083 A1 * | 6/2002 | Farenden | 188/2 D |
| 2003/0227010 A1 | 12/2003 | Petrak | |
| 2005/0145444 A1 | 7/2005 | Petrak | |
| 2007/0175289 A1 | 8/2007 | Sykes | |
| 2008/0196552 A1 | 8/2008 | Petrak | |

FOREIGN PATENT DOCUMENTS

| | | |
|---|---|---|
| DE | 4241389 | 4/1994 |
| DE | 19618421 | 5/1997 |
| EP | 0805104 | 11/1997 |
| GB | 2260588 | 4/1993 |
| JP | 58012857 | 1/1983 |
| JP | 2-159408 | 6/1990 |
| JP | 3-090461 | 4/1991 |

OTHER PUBLICATIONS

Halliday et al., Physics Parts I & II, John Wiley & Sons, Inc., pp. 87-90, 1967.

Petrak, Gregory H., "Affidavit of Gregory H. Petrak", 8 pages, Nov. 25, 2003.

Shigley et al., "Standard Handbook of Machine Design", McGraw-Hill Book Co., pp. 7.34-7.38, At least as early as Oct. 30, 1992.

Webster's II New Riverside Dictionary, The Riverside Publishing Co., pp. 198-199, 1994.

U.S. Appl. No. 12/183,760, filed Jul. 31, 2008, Petrak.

\* cited by examiner

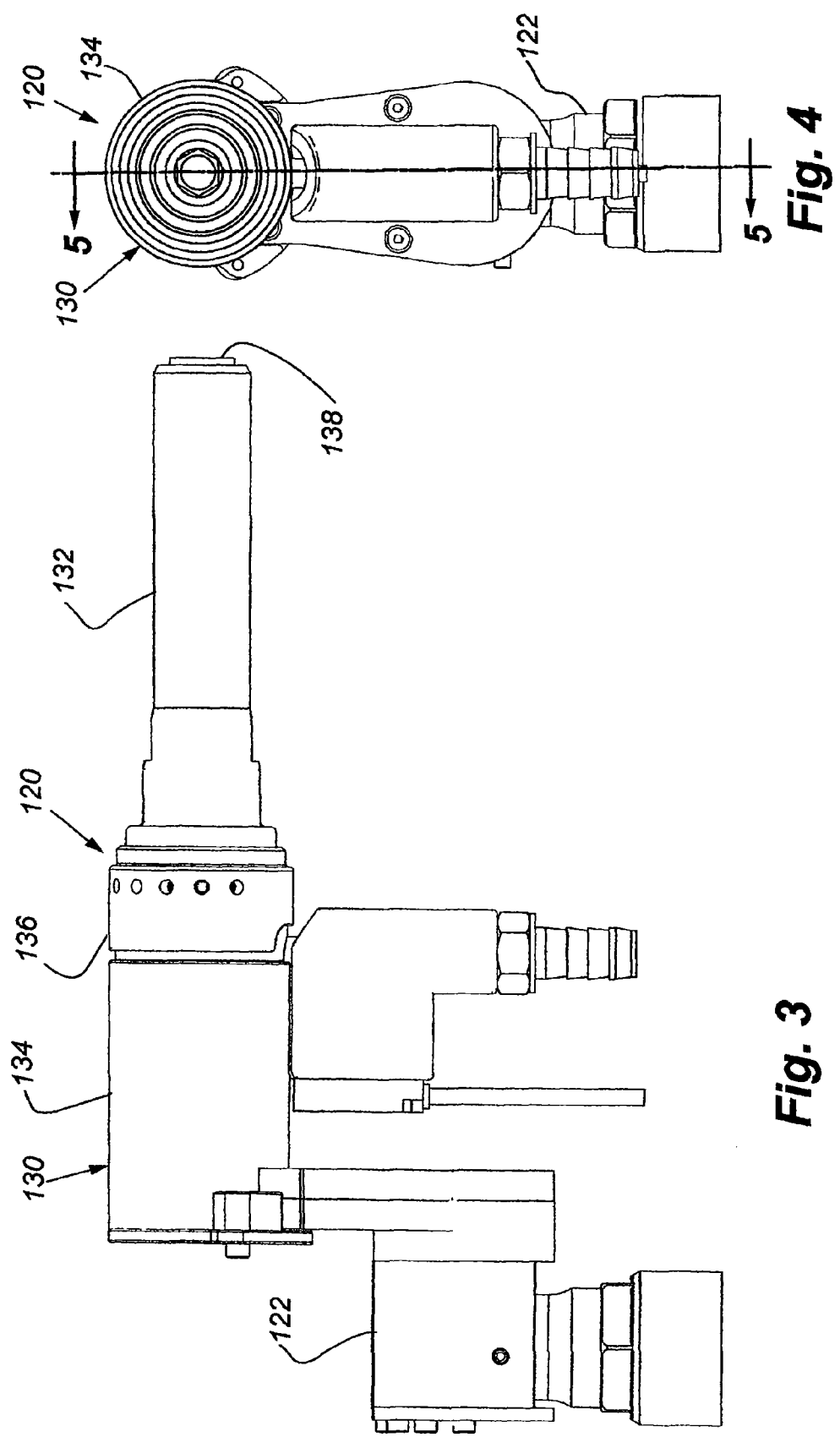

SYSTEM AND METHOD FOR TENSIONING AN EMERGENCY BRAKE SYSTEM

RELATED APPLICATIONS

This application claims the benefit under 35 U.S.C. §119(e) to U.S. Provisional Patent Application No. 60/953,185, filed Jul. 31, 2007, and entitled "System and Method for Tensioning a Brake System," which is incorporated by reference as if fully disclosed herein. This application also incorporates by reference U.S. patent application Ser. No. 10/369,989, filed Feb. 18, 2003, and entitled "Method and Apparatus for Tensioning an Emergency Brake System on a Vehicle," now U.S. Pat. No. 7,331,255; and U.S. patent application Ser. No. 10/254,050, filed Sep. 23, 2002, and entitled "Method and Apparatus for Tensioning an Emergency Brake System on a Vehicle," now U.S. Pat. No. 7,331,254, both of which are incorporated by reference as if fully disclosed herein.

FIELD OF THE INVENTION

This invention relates to apparatus and methods associated with the tensioning of an emergency brake system on a vehicle, and more particularly to an end effector that receives a nut and cable assembly and acts in conjunction with a tool and associated method to tension the brake system to the desired tension level.

BACKGROUND OF THE INVENTION

Conventional apparatus used in the assembly of emergency brake cable systems often require more than one person and more than one station on an assembly line for adequate installation and tensioning. Once the emergency brake cable system is initially installed, one assembly worker typically first tensions the system to the desired level, at which the voids are removed from the cable and the conduits through which the cable runs. At a second assembly position, a second assembly worker then typically reduces the tension in the system in a variety of ways so that the emergency brake cable system is not causing the brakes to be engaged. The existing systems require more than one assembly worker and more than one station, and thus are a relatively expensive endeavor.

A further limitation of the existing brake cable system installation technology is that the tension in the cable system is typically measured by indirect methods, such as strain gauges and other types of transducers. This means that the actual tension in the brake cable system, which is important to the proper functioning of the emergency brake, is at best characterized and not directly known during the assembly process. This indirect tension measurement has limited measurement accuracy, and thus causes there to be a relatively wide variation in the ultimate tension at which the emergency brake cable system is assembled in a vehicle. This creates unwanted variations in the emergency brake cable system operation on the finished vehicle.

Some other emergency brake tensioning systems have reduced the human element involved in the process by use of automated mechanisms. However, these systems use hydraulics or pneumatics as part of the process, which may lead to maintenance problems, cleanliness issues, tension measurement inaccuracies, and generally to a more complicated and inconvenient system.

What is needed is an emergency brake cable tensioning method and apparatus that overcomes the above issues, and allows fewer resources to be used in tensioning the cable system, thus saving money in the assembly process and ultimately allowing automobiles to be manufactured more efficiently. In addition, what is needed is an emergency brake cable tensioning method and apparatus that allows the direct measurement of the tension of the brake cable system during assembly to allow the accurate tensioning of the emergency brake cable system for proper performance in the finished vehicle. These and other advantages provided by embodiments of the present invention will be recognized from the following descriptions of embodiments of the invention.

SUMMARY OF THE INVENTION

In overcoming the shortcomings noted above, an inventive tensioning tool and associated method are described herein that, among other things, selectively create a mechanical column coupling to allow for the accurate measurement of the tension developed in an emergency brake tensioning system.

In one aspect of the invention, a tensioning tool for use in tensioning an emergency brake cable system for a vehicle is provided, the apparatus being driven by a rotational driver, and the brake system including a rotatable cable end. The apparatus includes a main body, a first portion movably positioned in the main body for engaging the cable end, the first portion movable between a first position and a second position, a second portion movably positioned in the main body and operably engaging the first portion, a locking mechanism associated with the main body and the second portion, the locking mechanism selectively actuable between a locked and unlocked engagement with the second portion, a release mechanism associated with the main body, the release mechanism actuable to unlock the locking mechanism from the second portion, wherein insertion of the cable end into the first portion and movement of the first portion to the second position causes the second portion to move to the second position and actuate the locking mechanism.

In a continuing aspect of the invention noted above, the main body includes a barrel portion, the first portion includes an input shaft positioned inside the barrel portion and that is movable relative thereto between the first position and the second position, the second portion including a piston assembly positioned inside the main body and being operably associated with the input shaft, and being movable relative to the main body between the first position and the second position, the locking mechanism mounted on the body and being operably engageable with the piston assembly to hold the piston assembly in the second position when actuated, and to allow the piston assembly to return to the first position upon deactuation, a release mechanism mounted on the main body and movable relative thereto and being operably associated with the locking mechanism to selectively de-actuate the locking mechanism, and wherein insertion of the cable end into the input shaft and movement of the input shaft into the barrel to the second position moves the piston assembly into the second position and actuates the locking mechanism to hold the piston assembly in an axial position relative to the barrel, and actuation of the release mechanism deactuates the locking mechanism and allows the input shaft and the piston assembly to return to the first position. The main body and the piston assembly may become a rigid mechanical column upon actuation of the locking mechanism in the second position.

In another aspect of the invention described herein, an apparatus for use in tensioning an emergency brake cable system for a vehicle is disclosed, the apparatus being driven by a rotational driver, and the brake system including a rotatable cable end, the apparatus including a main body having a rotatable portion rotatably movable and axially movable relative to the main body and adapted to receive the cable end, a tension measuring device, such as a load cell or other similar device, operably associated with the rotatable portion, and a first moving portion and a second moving portion, each of the first and second moving portions moving axially relative to the main body. The first and second moving portions having a first position wherein the cable end is movable relative to the rotatable portion, and a second position wherein the cable end is rotationally fixed relative to the rotatable portion, and wherein movement of the first movable portion from the second position to the first position causes the second movable portion to move to the first position and release the cable end. Further to this example, the first moving portion is positioned substantially external to the main body, and the second moving portion is a slider positioned substantially internal to the main body.

A method of practicing the invention is described herein and includes tensioning a brake system on a vehicle comprising the acts of inserting a cable end into a tool, manually actuating a locking mechanism to engage the cable end to establish a tensioning condition, tensioning the cable, and manually deactuating the locking mechanism to disengage the cable from the tool. Further to this method, the manually actuating step creates a rigid mechanical column against which to measure tension in the cable.

While multiple embodiments of the present invention are disclosed herein, still other embodiments of the present invention will become apparent to those skilled in the art from the following detailed description, which shows and describes illustrative embodiments of the invention. As will be realized, by those of ordinary skill in the art upon reading the following disclosure, the invention is capable of modifications in various aspects, all without departing from the spirit and scope of the present invention. Accordingly, the drawings and detailed description are to be regarded as illustrative in nature and not restrictive.

BRIEF DESCRIPTION OF THE DRAWINGS

FIG. 3 is a side view of the tensioning tool of FIG. 2.

FIG. 4 is an end view of the tensioning tool of FIG. 3.

DETAILED DESCRIPTION

Figure 1:
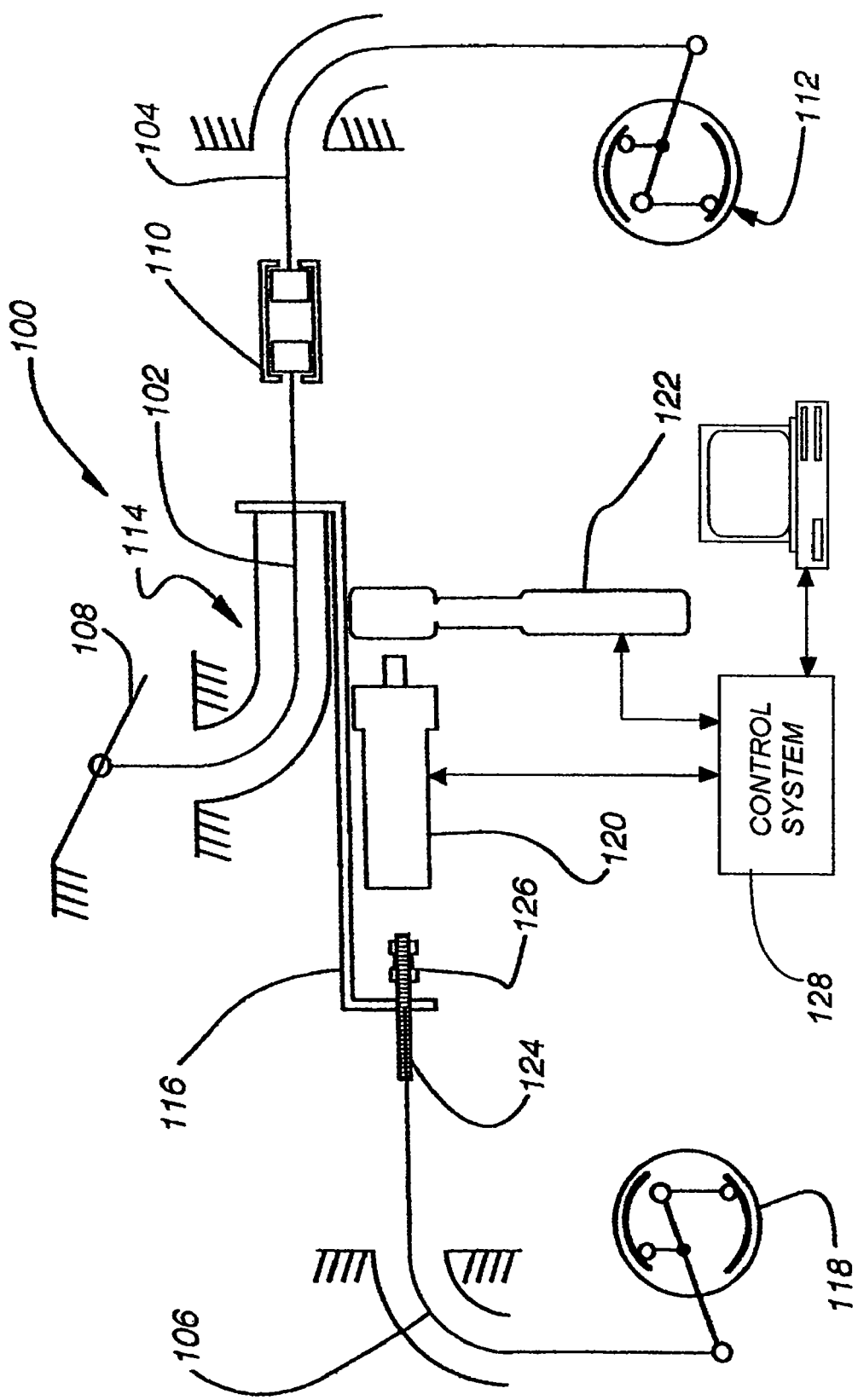
FIG. 1 shows a diagram of an exemplary emergency brake cable system to be tensioned by the inventive tensioning tool and associated method as described herein.

The instant invention is embodied in a tensioning apparatus attachment to a drive tool, such as a ratchet, nut runner, or other type of wrench, used for tensioning the park brake cable system of an automobile during assembly. A schematic of one embodiment of the present invention and the system in which it works is shown in FIG. 1. FIG. 1 illustrates a side pull park brake system 100. In the park brake system 100 in which this invention is described, there is a front cable 102, a rear right cable 104 and a rear left cable 106. The front cable 102 is attached to a pull handle 108 at its first end and at its second end it is attached to a connector clip 110, which in turn attaches to the front end of the rear right cable 104. The rear right cable extends towards and attaches to the brake assembly 112 on the rear right wheel. The front cable 102 and the rear right cable 104 could be one continuous cable, however, it has been found more convenient to have them be separate cables for ease of manufacturing. The rear left cable 106 is attached to the front cable 102 through a reactive conduit system 114 as is well-known in the art. In the instant embodiment, the front end of the rear left cable 106 is attached to one end of an equalizer bracket 116, which is in turn attached to and part of the reactive conduit system 114. The rear end of the rear left cable 106 is attached to the rear left brake assembly 118.

The operation of a reactive conduit side pull park brake system 100 is well-known. The problem solved by the present invention is that the tensioning of the system during assembly is made significantly more convenient by use of a tensioning apparatus 120 conforming to the present invention in combination with a drive means 122, which results in an accurately tensioned cable system. In addition, the use of a tensioning apparatus 120 can reduce overall costs of building the park brake system into a vehicle during assembly, it can improve quality, and its use can reduce labor costs.

The front end of the rear left cable 106 includes a threaded rod 124 of approximately one-half inch to four inches long. The free end of the threaded rod is positioned through an aperture in the end of the equalizer bracket 116 and a nut 126 is positioned on the free end of the threaded rod 124 in order to hold the threaded rod in attachment with the equalizer bracket. The tensioning apparatus 120 and the drive means 122 are used to tension the entire park brake cable system to remove voids and stretch from the various park brake cables so that the park brake cable system 100 functions appropriately during the use of the vehicle, and to lessen slackening or loosening. The particular tensioning apparatus 120 by itself, or in combination with the drive means 122 (collectively referred to as the "park brake tensioning system"), which are used together to tension the park brake system, incorporate the present invention.

One of the brake system assembly benefits provided by the park brake tensioning system of the present invention involves the utilization of a relief distance. The relief distance is the distance that the end of the cable being used to tension the system is allowed to relax after the tensioning of the system has been performed. Relaxation of the tension releases the engaged brakes from the drums, or the calipers from the disk (for disk brakes), just enough to allow the wheel to turn freely while keeping a sufficient level of tension in the park brake system in order to easily engage the parking brake.

Note that the tensioning method and apparatus of the present invention can be implemented at any place in a park brake cable system where there is an action/reaction point, such as where the park brake handle attaches to the front cable, where the rear cable is attached to the brake assemblies, where the front cable and rear right cable attach together, or other locations.

Referring still to FIG. 1, the tensioning apparatus 120, including the nut runner 122, is interfaced with a control system 128 to monitor and control the operation of the tensioning apparatus 120. The control system 128 works to measure tension in the system and control the operation of the nut runner 122 to increase, decrease or maintain tension. The system in which the tool is utilized includes (in a non-limiting way) the tool 120, the nut runner 122, and the control system 128. The control system 128 is in operable communication with a load cell (described below), or other load or tension measurement device or component associated with the tensioning apparatus 120, to receive and/or send signals therefrom and thereto. The control system 128 is also in operable communication with the nut runner 122 to receive and/or send signals therefrom and thereto. The control system 128 may include software, CPU, memory, inputs and outputs, digital or analog components, displays and data outputs, and programmable logic units to facilitate controlling and feedback instructions and data collection and analysis from the system for operation of the tensioning tool 120. The control system 128 may include the ability to receive from and output to a data and/or display signal and/or to a wired or wireless network for observing and operating of the control system. Alternatively, the nut runner 122 may be controlled manually.

Figure 2:
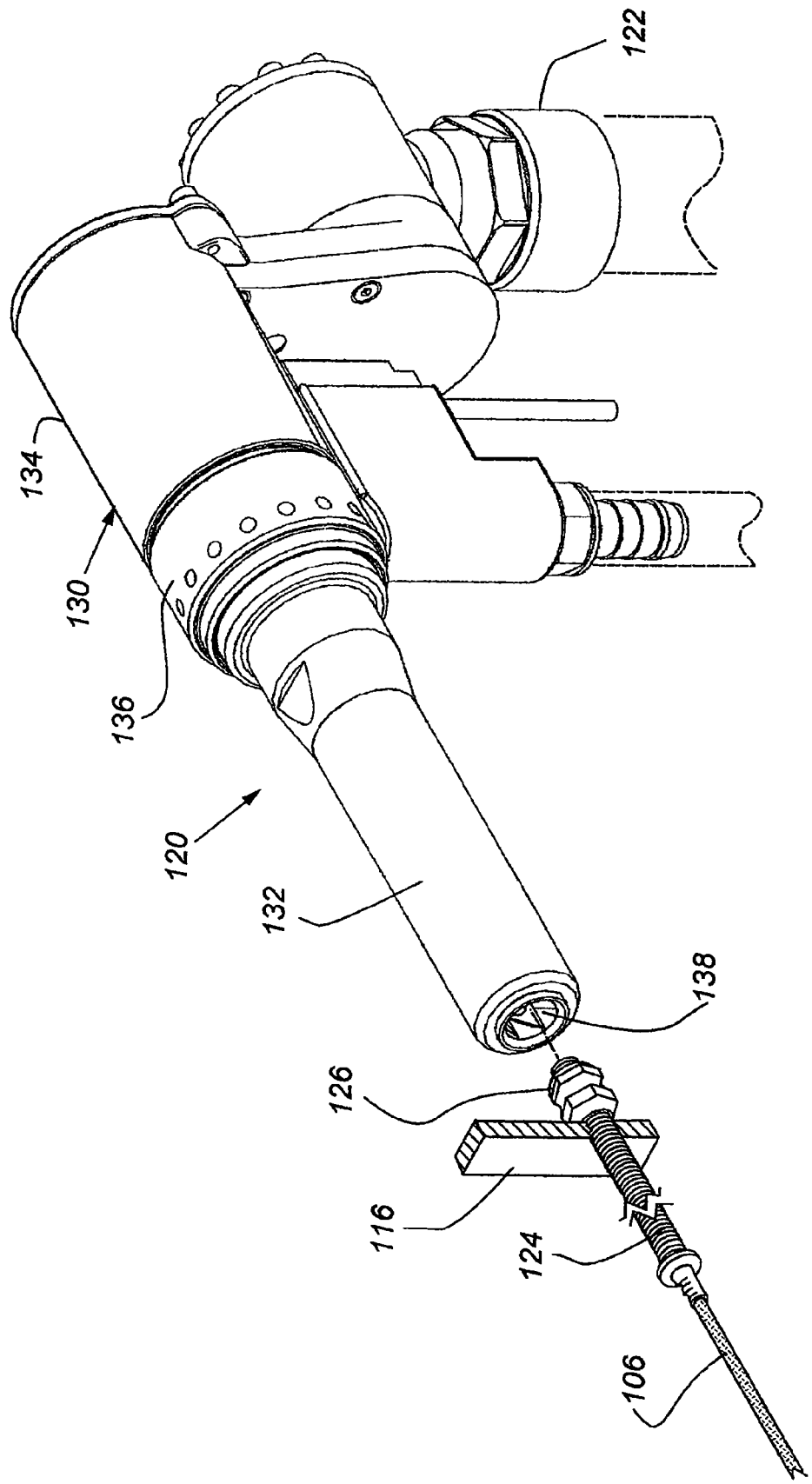
FIG. 2 is a perspective view of the tensioning tool of the present invention, prior to mounting the nut in the end effector.

As shown in FIGS. 2, 3 and 4, the tensioning tool 120 includes a main body 130 having a barrel 132 operably associated with a housing 134. The tensioning tool 120 includes a release ring 136 movable relative to the housing 134 and the barrel 132, and in this embodiment is externally disposed relative to the housing. The release ring 136 may be internal to or a combination of internal and external to the housing. The release ring 136 allows the relative motion of internal portions of the barrel 132 and housing 134 with respect to the barrel and housing.

The nut 126, or cable end, is attached to the threaded rod 124 as part of the cable assembly in an emergency park brake system. The threaded rod 124 extends through the equalizer bracket 116, with the nut 126 keeping the rod 124 (and cable 106 to which it is attached) from being pulled back through the bracket 116 by the tension in the cable. The equalizer bracket 116, as explained above, is attached to the reactive conduit of the emergency brake system, or it may be attached directly to the frame of a vehicle, depending on the design of the emergency braking system.

In general, the nut 126 is first threaded on the rod 124. The nut 126 is then positioned into the end effector 138 in the barrel 132 of the tensioning tool 120. The nut 126 is then pushed into the end effector 138 to push the end effector and the nut further into the barrel 132. This causes the structure internal to the barrel 132 to move rearwardly (described in more detail below), freeing the release ring 136 to move forwardly and lock the nut 126 in the end effector 138 and a portion of the internal structure in engagement with the barrel 132 and the housing 134. This locking mechanism causes the internal structure, housing and barrel to form a rigid, mechanical structure or column against which to tension the emergency brake system. This mechanical structure is effectively a column oriented along the length of the cable, which will provide a very incompressible system against which to measure the tension. Because generally in this example the system does not rely on any pneumatic or hydraulic components to maintain its incompressibility, it may be simpler, more reliable, and have less associated support equipment and related maintenance than those that do.

With the end of the barrel 132 resting on the equalizer bracket 116, tensioning of the cable system can then begin by actuating the nut runner 122, which in turn rotates the end effector 138 and runs the nut 126 up the threaded rod 124. When the desired tension is reached, the release ring 136 is manually pulled rearwardly relative to the housing 134, which unlocks the internal structure and allows the end effector 138 and the nut 126 to move toward the equalizer bracket 116 and release the nut 126 from the end effector 138.

In general, with reference to FIGS. 5-9, an example of, and the operating method, of the present invention is shown. The housing 134 is generally cylindrical in shape, with portions having various dimensions, and defining an internal cavity 140. A front portion 142 of the housing 134 has a reduced external and internal dimension and receives the release ring 136, as well as a rear end 144 of the barrel 132. A shoulder 148 is formed between the rear portion 146 and the front portion 142 of the housing 134 where the internal and external diameters transition. The release ring 136 is mounted circumferentially around the front portion 142, and is axially slidable relative to the housing 134. The front portion 142 of the housing 134 includes at least one aperture 150 formed therein. If more than one aperture is formed, they are formed annularly around the front portion 142. Each aperture 150 receives a locking ball 152, which moves radially through the aperture based on the relative positioning of the locking ring 126 and piston assembly 154, as is described in more detail below. The rear end 144 of the barrel 132 is threadedly engaged with an externally threaded terminal end of the front portion 142. An external shoulder 156 on the front portion 142 engages an internal shoulder 158 on the rear end 144 of the barrel 132 to seat the two together. The rear portion 146 of the housing 134, as noted above, includes a slot 160 formed in its sidewall for allowing axial motion of certain components that are positioned in the housing and extend through the slot to outside the housing. An aperture 162 is also formed to allow the nut runner to be inserted into the housing to actuate the internal components.

Figure 5:
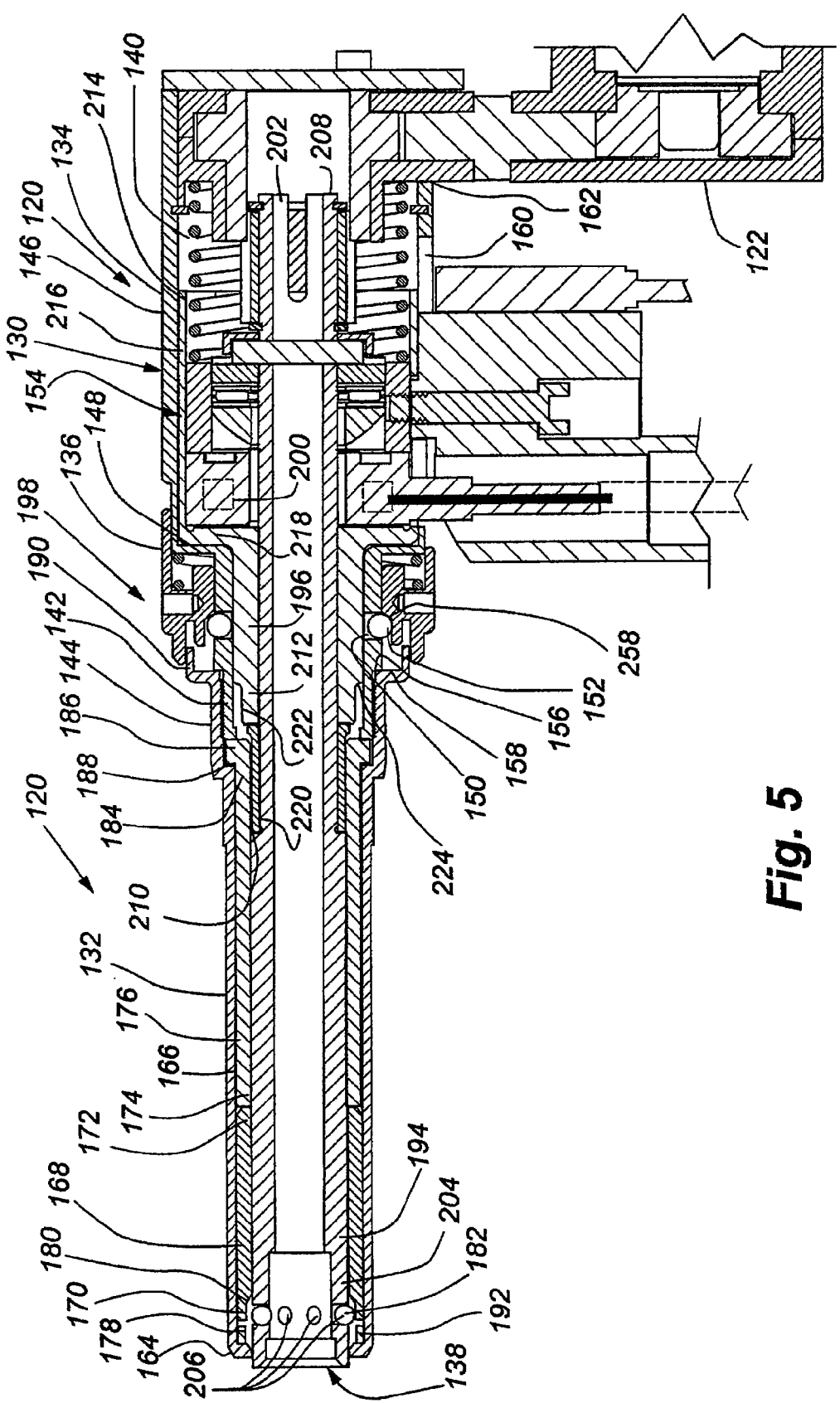
FIG. 5 is a section view taken along line 5-5 of FIG. 4, showing the tensioning tool of the present invention prior to receiving a nut in the end effector, and with the input shaft and piston assembly in their forward-most position.

Still referring to FIG. 5, the barrel 132 is shown engaged at its rear end 144 with the front portion 142 of the housing 134. The barrel 132 has an elongated cylindrical shape, and includes a front end 164 opposite its rear end 144. The barrel 132 also defines an internal cavity 166 extending from one end to the other. The barrel 132 is lined by a sheath including two collar lengths positioned end to end. Each collar length has a first end and a second end. The front collar length 168 has a first end 170 adjacent the front end 164 of the barrel 132, and a second end 172 adjacent the first end 174 of the rear collar length 176. The first end 170 of the front collar length 168 has a first larger interior diameter 178, transitioning by a nut-engagement shoulder 180 or cam surface to a second smaller interior diameter. This internal region formed by the first larger interior diameter 178 is utilized for grasping the nut 126 using a series of nut engagement balls 182, as described later.

The rear collar length 176 has a first end 174 adjacent the second end 172 of the front collar length 168, and a second end 184 adjacent the threaded engagement between the rear end 144 of the barrel 132 and the front portion 142 of the housing 134. The second end 184 of the rear collar length 176 has an outwardly extending flange 186 to allow it to be seated against a shoulder 188 formed adjacent the rear end 144 of the barrel 132 by the terminal end of the front portion 142 of the housing 134 when the barrel 132 and the housing 134 are engaged together as shown in FIG. 5. The rear terminal end of the barrel 132 forms a substantially annular axial extending lip 190 that has a larger internal diameter than the front 142 of the housing 134, and is spaced away therefrom to form an annular space. The axial lip 190 extends rearwardly over the front portion 142 of the housing, and rearwardly from the threaded engagement between the barrel 132 and the housing 134. A washer 192 may be positioned between the first end 170 of the front collar length 168 and the front end 164 of the barrel 132.

Still referring to FIGS. 5-9, the housing 134 forms an anchor structure relative to which some of the internal components move in one condition, and to which some of the internal components are locked in another condition. The internal components include an input shaft 194, a piston 196, a locking structure 198, a tension measurement structure 200, and a nut runner engagement portion 202. The input shaft 194 is positioned in the barrel 132, inside the sheath, and is rotatable and axially movable relative thereto. The front end 204 of the input shaft 194 includes an end effector 138, which receives the nut 126 and threaded rod 124 (see FIGS. 6, 7, 8, and 9). The end effector 138 has at least one aperture 206 formed therein to receive a corresponding nut engagement ball 182 and allow the ball to move radially in and out of the aperture in conjunction with the relative position of the input shaft 194 along the length of the barrel 132. The end effector 138 acts with the nut engagement balls 182 and the nut engagement cam 180 to securely trap (both axially and rotationally) the nut in the end effector when desired, and is described in greater detail below.

The input shaft 194 extends from a front end 204 adjacent the front end 164 of the barrel 132 along the length of the barrel and through the housing 134 to a rear end 208 in operable engagement with the nut runner 122. The rear end 208 of the input shaft 194 is operably associated with the nut runner 122, which acts to selectively rotate the input shaft 194 clockwise or counter clockwise, or to stop rotation, depending on the controls received from the control system 128. This rear end 208 of the input shaft 194 may move relative to the nut runner 122, and may move into and out of operable engagement therewith, or may move relative to the nut runner 122 and stay in operable engagement therewith through the entirety of the movement.

Along a central section of the input shaft 194, near the rear end 144 of the barrel, prior to entering the front portion 142 of the housing 134, the input shaft 194 forms a circumferential shoulder 210 where the outer diameter of the input shaft 194 is reduced. The input shaft 194 rotates along its longitudinal axis relative to the housing 134 and the barrel 132, under the control of the nut runner 122.

The piston 196 is received over the input shaft 194, and is positioned inside the first 142 and second 146 portions of the housing 134. The piston 196 may be fixed in its position relative to the length of the input shaft, but the input shaft 194 and the piston 196 may rotate relative to one another. The piston 196 has a front portion 212 and a rear portion 214. The front portion 212 is generally coextensive with the front portion 142 of the housing and also fits closely around the external surface of the input shaft 194. The rear portion 214 is spaced away from the external surface of the input shaft 194, and the circumferential piston walls 216 fit closely with the internal wall of the rear portion 146 of the housing 134, forming an annular space therein. Corresponding internal and external shoulders 218 are formed where the piston transitions from the front 212 to the rear 214 piston portion.

The front end of the front portion 212 of the piston 196 engages a spacer sleeve 220 positioned on the outside of the input shaft 194. One end of the spacer sleeve 220 engages the shoulder 210 on the outside of the input shaft 194, and the other, rear end of the spacer sleeve 220 abuts the front portion 212 of the piston 196. The front portion 212 of the piston 196, on its external circumference, forms an annular recess 222. The rear end of the annular recess forms an annular shoulder 224 to work in conjunction with the locking balls 152 to fix the piston 196 and input shaft 194 relative to the housing 134, as is explained in more detail below.

Figure 6:
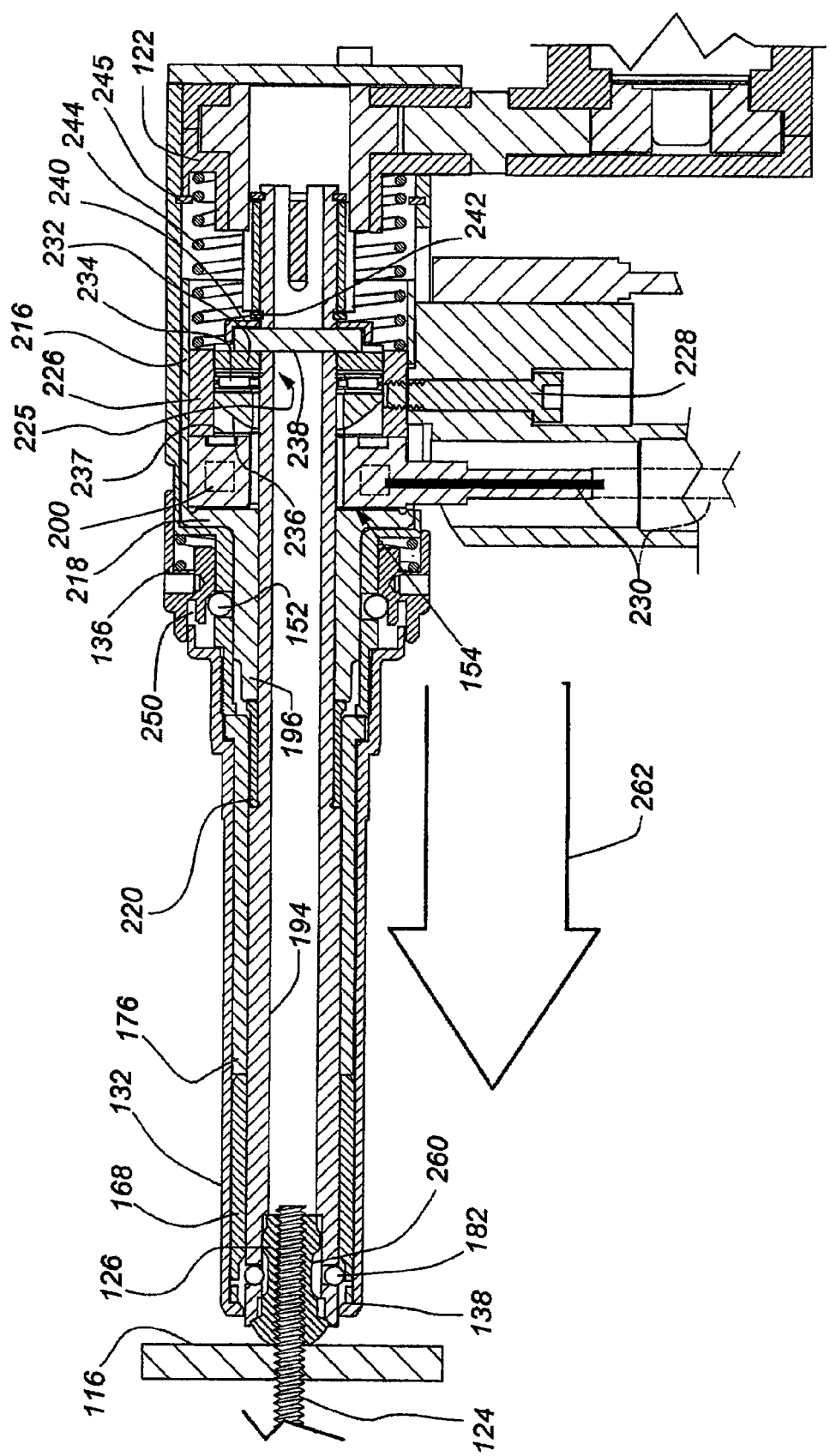
FIG. 6 is a section view similar to that of FIG. 5, but after the nut has been inserted into the end effector, and prior to moving the input shaft and piston assembly rearwardly relative to the barrel and housing.

Referring still to FIGS. 5-10, and particularly FIG. 6, various components are positioned within the annular space between the walls 216 of the rear portion of the piston 196 and the input shaft 194, referred to above as the piston assembly 154. A load cell 200 is received on a bearing on the input shaft 194 in order to allow the input shaft to rotate relative to the load cell, and the load cell abuts on its front side the internal shoulder 218 of the piston 196. The internal shoulder 218 of the piston 196 is the surface against which the load cell is compressed to measure the tension is the cable system. In one embodiment the load cell is concentrically positioned around the input shaft 194, and because of this annular orientation around the input shaft 194, the load cell 200 measures the load in-line with the application of the load by the input shaft, and generally in-line with the terminal end of the cable system to which the input shaft 194 is attached.

An assembly of items that generally combine together to apply a load responsive of the cable tension to the load cell 200, called the compressive component 225, are described hereafter. In one example described herein, an axial collar 226 abuts the rear surface of the load cell 200 and extends along the walls 216 of the second portion 214 of the piston 196. Structure associated with the piston assembly 154 external to the housing 134 may be attached to the collar 226, such as by a screw 228, and extend through the slot 160 in the housing 134. This external structure thus may move along with the piston 196. This structure may include the input/output communication cable 230 for the load cell 200, among other items. A radial collar 232 is positioned about the input shaft 194 inside the rear end of the axial collar 226. The front face of the radial collar 232 engages a facial bearing 234. The radial collar 232 may rotate with the input shaft 194 while in engagement with the facial bearing 234. The facial bearing 234 helps isolate the rotation of the radial collar 232 with the input shaft 194 from the load cell 200. The facial bearing 234 is supported by a mount 236, which may itself be mounted on a bearing on the input shaft 194. The front surface 237 of the mount 236 may engage the rear surface of the load cell. A retaining collar 238 is mounted on the input shaft 194 and is held in axial position against the radial collar 232 by a retainer 240 and snap ring washer 242. This compressive component 225, made up of elements described herein that apply a load to the load cell, acts to transmit the load applied to the input shaft to the load cell.

The compression applied to the load cell 200 is derived, in one embodiment, from the cable pulling on the input shaft 194 as the cable system is tensioned. As the input shaft is pulled to the left (in the orientation of FIG. 6), the compressive component 225 applies a load to the load cell 200. In more detail of this particular example of the invention, the snap ring washer and retainer 240 apply a force in that direction to the retaining collar 238, which in turn applies a load in that direction to the radial collar 232, which in turn applies a load in that direction to the facial bearing 234 and mount 236, which in turn apply the load in that direction to the load cell 200. The load cell abuts on its front surface the shoulder structure 218 of the piston 196, and is thus compressed between the load applied as described above and the shoulder structure 218. The piston 196, being locked to the housing by the structure described herein, provides a solid base against which the load cell may be compressed. The load cell creates a signal indicative of the load (cable tension) and transmits that signal along line 230 to the control system 128 for storage, display, analysis and/or possible control of the nut runner and tensioning tool.

Various other structures may be employed to create the compressive component 225 to apply a load to the load cell 200 and allow the input shaft 194 to rotate. For instance, and in a non-limiting manner, the retaining collar 238 may be circumferentially mounted on the input shaft, similar to the radial collar 232. It may turn with the input shaft or be rotationally independent of the input shaft. It may extend all or partially through the input shaft, as shown, acting in part as a pin, as a manner of mounting on the input shaft. The radial collar 232, facial seal 234, and/or other components may also not be included. Also, the axial collar 226 may be axially movable relative to the piston walls and be operably associated with the retaining collar 240 and snap ring 242 and be loaded thereby (ultimately by the tension load on the input shaft as described above) and in turn apply a load, along with or separate from the mount 236, to the load cell 200. The axial collar may also be cup-shaped and rotatably mounted on the input shaft, and axially movable with respect to the piston walls, with the mount 236, facial bearing 234 and radial collar 232 mounted relatively within the cup. When the load is applied through the retaining collar to the radial collar, the facial bearing and to the cup-shaped axial collar, the bottom of the cup-shaped axial collar may apply the compressive load to the load cell 200. Further, all of the structure described above may not be required to create the resulting load on the load cell. Additionally, other structure may be added if desired.

The compressive component 225 may also include, in another example, the radial collar 232, mount 236 and any additional structure retained on the input shaft in an axial location by a pin positioned through the input shaft. When the tension is applied to the input shaft, the pin holds the compressive component 225 in axial position on the input shaft in order to apply the tension load to the load cell. The compressive component 225 that engage the load cell 200 may be positioned annularly around the input shaft to engage the load cell 200 about its annular shape. The portions of the compressive component that are inside the axial collar 226 may rotate with the input shaft, or may not rotate with the input shaft.

As can be appreciated from the above description, the structure of the compressive component 225 associated with the piston assembly and input shaft 194 may have many forms different than that described above to perform the same or similar function of allowing the input shaft to rotate relative to the piston, and apply a load to a load cell for measuring the tension in the cable system during the tensioning process. Further, the load cell 200 may be positioned in the main body, and operably associated with the main body or piston 196 in other orientations to measure the load. The load cell may also be replaced with another type of load sensor that works to measure load in either compression, tension, lateral deflection or the like.

The rear end 208 of the input shaft 194, as mentioned above, is arranged to engage the drive end of the nut runner 122, and may axially slide therealong as needed when the input shaft 194 is moved axially, as explained below. The particular engagement arrangement of the nut runner 122 and the input shaft is not critical to the nature of the invention described herein.

Continuing to refer to FIG. 6, a return spring 244 is positioned in the second portion 146 of the housing 134 to urge the piston 196 forwardly in the housing 134. In this instance the spring 244 is positioned between a portion of the nut runner 122 fixed by a snap washer 245 to the rear of the housing 134, and the axial collar 226. The return spring 244 compresses as the input shaft 194 and piston 196 are moved axially rearwardly, and continually biases the piston 196 and input shaft 194 forwardly. This forward biasing force will be described in more detail hereafter.

Figure 7:
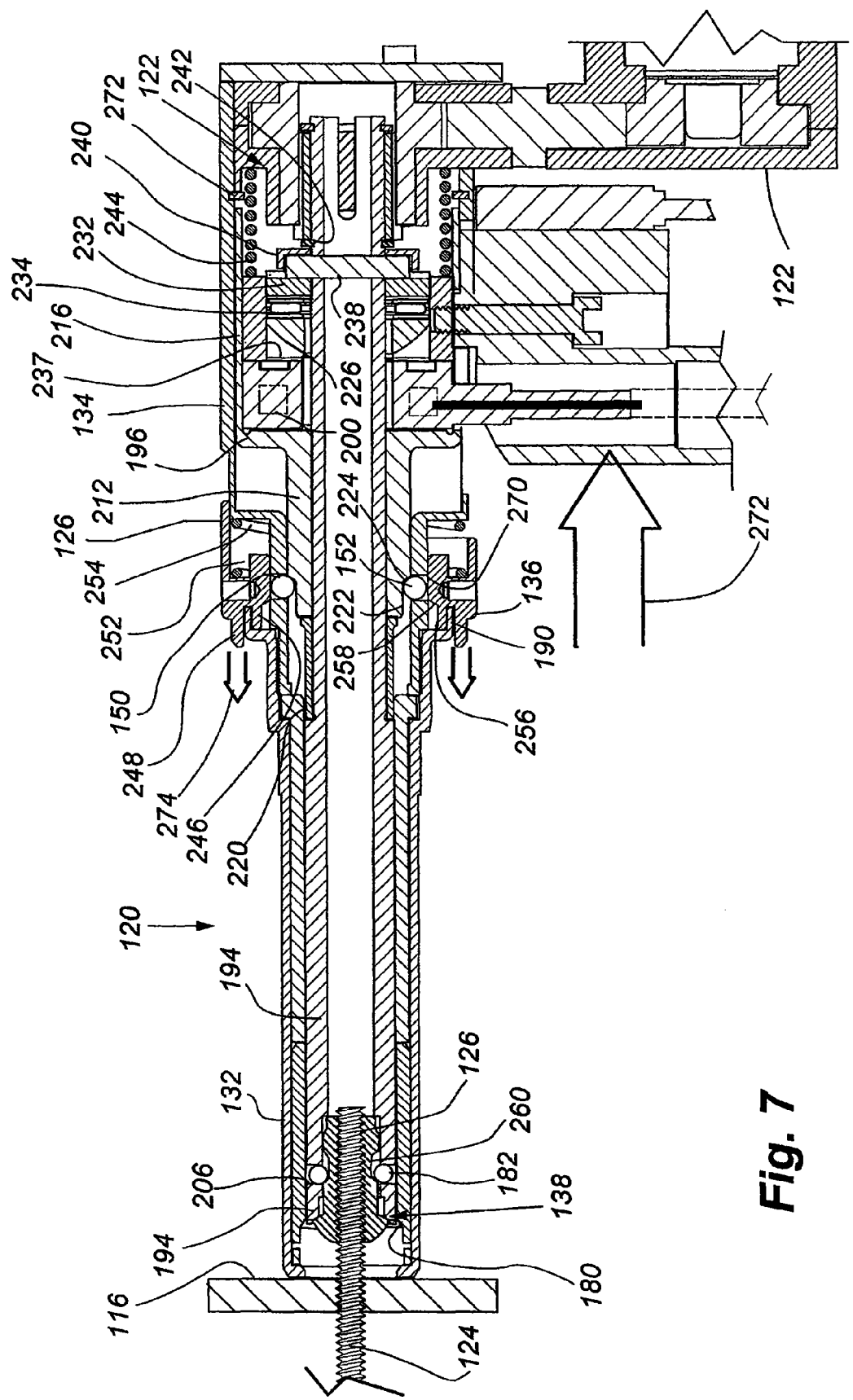
FIG. 7 is a section view similar to that of FIG. 6, but after the input shaft and piston assembly have been moved rearwardly into the barrel and housing, causing the release ring to move forward and actuate the locking mechanism to form a rigid mechanical column structure.

Referring still generally to FIGS. 5-8, and particularly to FIG. 7 for clarity, the release ring 136 is positioned around the front portion 142 of the housing 134 and moves axially on the along the front portion 142. The release ring 136 includes an annular inner lip 246 and an annular outer lip 248 extending forwardly, with a gap 250 formed therebetween (See FIG. 6). The gap 250 receives the rear lip 190 formed on the barrel 132. An annular recess 252 is formed facing rearwardly to receive and seat the front end of the release spring 254. The rear end of the release spring 254 engages the outer shoulder 148 of the housing 134. A rear portion of the release ring 136 extends over and moves relative to the second portion 146 of the housing 134 to help contain the release spring 254. The radially inward surface 256 of the inner lip 246 acts to retain the locking ball 152 in the aperture 150 in the first portion 142 of the housing 134. A cam or shoulder surface 258 is formed a the base of the inner lip 246 to encourage the locking ball 152 to move radially inwardly through the aperture 150 as the release ring 136 is moved forward relative to the housing 134, as is described below.

The release mechanism, in this instance a release ring 136, may move from a forward position to a rearward position along the front portion 142 of the housing 134. The release spring 254 biases the release ring 136 towards the forward position. In the forward-most position, the release ring abuts the annular lip 190 on the barrel 132. (see FIG. 7). The release ring 136 may also take the form of a lever or other structure not in the form of a ring or circle.

The input shaft 194 is operably engaged with the piston 196 to move the piston rearwardly when the input shaft 194 moves rearwardly (toward the nut runner 122). The input shaft 194 may be operably engaged with the piston 196 to move the piston forwardly upon forward movement of the input shaft 194, but is not necessarily so engaged.

The operation of the tensioning apparatus 120 of the present invention is now described with respect to FIGS. 5-8. After the nut 126 is threaded onto the end of the threaded rod 124 as described above, the nut 126 is positioned in the end effector 138 and is engaged with the input shaft 194 to be turned by the input shaft as the input shaft is turned by the nut runner 122. Prior to insertion of the nut 126, the tensioning apparatus appears in the ready state shown in FIG. 5. In the ready state, the input shaft 194 is positioned forwardly in the barrel 132 with the end effector 138 positioned and ready for insertion of the nut 126. In this forward position, the piston 196 is in its forwardmost position with the outer shoulder 218 engaging the inner shoulder 148 of the housing 134. The release ring 136 is in its rearward most position, with the locking balls 152 moved by the outer surface of the first portion of the piston 196 to their radially-outermost positions in the respective apertures 150 in the first portion 142 of the housing 134 and bounded by the inner-lip 246 of the release ring 136. The release ring 136 may not move any more forwardly because of the locking balls 152, which engage the cam surface 258 of the release ring 136. Since the locking balls 152 are held in position by the walls of their respective apertures 150, the locking balls 152 keep the release ring 136 from moving forward under the force of the release spring 254. The return spring 244 in the housing 134 is in the extended position. In this embodiment, the rear end of the input shaft 194 is in engagement with the nut runner 122.

FIG. 6 shows the tensioning tool 120 positioned over the nut 126, and specifically the nut 126 being received in the end effector 138. This is performed manually, or may be performed automatically with the appropriate automated equipment. In this position the tensioning tool 120 stays in the ready state. Note that the nut 126, in this embodiment, defines a circumferential groove 260 for receiving the nut engaging balls 182 in the end effector 138. When positioned in the end effector 138, the groove 260 in the nut 126 is radially aligned with the nut engaging balls 182. The arrow 262 represents the movement of the tensioning tool 120 towards the bracket 116, which may occur at this time.

FIG. 7 shows the nut 126 and the end effector 138 having been pushed into the barrel 132. This movement is performed manually by an operator grasping the threaded rod 124 and pushing the threaded nut 126 into the tensioning tool 120 a certain amount. It may be performed automatically, also, with the appropriate automation device. Moving the nut 126 further into the tensioning device 120 has at least two purposes. First, it causes the end effector 138 to engage the nut 126 in the input shaft 194 and retain it there both axially and rotationally (the end effector 138 has a recess having a complementary shape to the shape of the nut 126). Second, the rearward movement of the input shaft 194 actuates the locking device 198 to firmly engage the piston 196 in the retracted position with the barrel 132 and housing 134, forming the rigid structure against which the tension of the system, created by the cable pulling on the input shaft 194, is measured during the tensioning step. Also, by moving the nut 126 away from the equalizer bracket 116, the tension load measured is substantially isolated from the normal forces on the face of the nut that would affect that measurement if the nut 126 was in engagement with the equalizer bracket 116.

Referring still to FIG. 7, the nut 126 is withheld by the end effector 138 by at least one nut engagement ball 182 that is held in engagement with a groove 260 in the nut 126. As the nut 126 is moved rearwardly, the nut engagement ball 182 moves through the aperture 206 in the front end of the input shaft 194. As the ball 182 and the input shaft 194 move rearwardly relative to the barrel 132 and housing 134, the cam surface 180 on the front collar length 168 helps urge the ball 182 radially inwardly through the apertures 206 and into the groove 260 in the nut 126. The ball 182 is held in this engaged position with the nut 126 by the internal surface of the front collar length 168 of the barrel 132. In this way, when the input shaft 194 is moved rearwardly into the barrel 132, the nut 126 is releasably engaged with the end effector 138 and the nut 126 then moves axially and rotationally with the input shaft 194. The distance the nut 126 must be moved into the end effector 138 to cause engagement is generally the relief distance. The relief distance may be that distance which the nut 126 must travel, after the brake system has been tensioned, in order for the brakes shoes or calipers to release from the drums or discs (respectively) to allow the wheels to turn freely. Alternatively, the control system 128 may instruct the nut runner to lessen the tension by appropriately rotating the nut along the threaded shaft 124.

Still referring to FIG. 7, the rearward movement of the input shaft also causes the piston 196 (and piston assembly 154) to move rearwardly in the tensioning tool 120. The input shaft 194 causes the spacer collar 220 to move, which in turn causes the piston 196 to move rearwardly. The piston 196 moves rearwardly in the housing 134, compressing the return spring 244. The rearward movement of the piston 196 also moves the front portion 212 of the piston 196 rearwardly relative to the locking ball 152 held in the release ring 136. As the front portion 212 moves rearwardly, the recess 222 formed therein moves under the locking ball 152 (or balls). The locking ball 152, while positioned in the recess 222 and engaging the outer surface of the front portion 212 of the piston 196 and the shoulder 224 of the recess 222, moves from engaging the cam 258 on the release ring 136, which was keeping it in its rearward most position. As the locking ball moves radially inwardly, encouraged by the angular force applied by the cam 258 on the locking ring 136, the locking ball 152 moves through the aperture 150 into the groove 222 on the front portion of the piston, and out of interfering engagement with the release ring 136. The release spring 254 then biases the release ring 136 forwardly on the front portion 142 of the housing 134 to the release ring's forward-most position. In this forward-most position, the axial lip 190 on the rear of the barrel 132 is received in the annular recess 250 between the radially inner 246 and outer lips 248 at the front end of the release ring 136, thus prohibiting the release ring 136 from any further forward motion. This brings the inner retaining wall 270 of the release ring 136 into engagement with the locking ball 152, which then holds the locking ball 152 against the piston 196. At this location, the piston 196 is biased forward, so the shoulder 224 at the border of the recess 222 is pushed into engagement with the portion of the locking ball 152 extending radially inwardly from the aperture 150, thus keeping the piston 196 from moving any further forwardly. The piston 196 thus may not move any further forwardly relative to the barrel 132 or housing 134, and is fixed axially relative to the input shaft 194. The piston walls 216, at this position, are sized to engage in physical interference at or near the end of the housing, but may not be required to. In this embodiment, the interference is caused by a snap ring 245 positioned in the inner wall of the housing 134 at the appropriate location, used to hold a portion of the drive means 122 in location in the housing 134. Note, at this position, if the piston walls 216 were of shorter length, the input shaft 194 and piston 196 may be pushed further into the barrel and housing if desired, but need not be.

The release ring 136, forward portion of the housing 142, locking balls 152 and the forward portion 212 of the piston 196 combine to create a mechanical locking system 198. This mechanical locking system 198 converts the relative movement between the barrel 132 and housing 134 with the piston 196 into a rigid column. This mechanical locking system 198 works automatically under the spring bias of the release spring 254 primarily in operative association with the release ring 136. Once the input shaft 194 and piston 196 are pushed far enough rearwardly into the barrel 132 and housing 134, the locking mechanism 198 engages to automatically to form the rigid column between the housing 134, barrel 132 and piston 196. The rigid column allows the tension of the cable system to be measured directly through a rigid mechanical structure by the load cell with no reliance on an incompressible fluid system, such as hydraulics, or high-pressure pneumatics, and the associated support equipment and maintenance. The arrow 272 in FIG. 7 shows the relative motion of the input shaft 194 and piston assembly 154. The arrow 274 shows the relative motion of the release ring.

In this locked mechanical column system shown in FIG. 7, the load on the cable system is measured by the load cell 200 positioned between the now anchored inner shoulder 218 of the piston 196 and the compressive component 225, including in one embodiment the collar 238 mounted near the inner end of the input shaft 194. As the system is tensioned (as explained below), the cable 106 pulls the nut 126, which pulls the end effector 138, which pulls the input shaft 194, which pulls the collar 238 (and the elements of the compressive component 225) to effectively compress the load cell 200. The compression of the load cell 200 is communicated to the control system 128 and translated to a tension load, which data is used by the control system 128 for display and to control the nut runner 122 and possibly other equipment.

The cable system, as described above regarding FIG. 7, may now be tensioned with the tensioning tool 120. At this position, the control system 128 may send control signals to the nut runner 122, which rotates the input shaft 194, and thus rotates the nut 126 on the threaded rod 124. As the input shaft 194 is rotated, the piston 196 may not be rotated. In the embodiment described herein, the collar 238 in engagement with the facial seal rotates with the input shaft 194. As the threaded rod 124 is pulled through the nut 126, the tension increases in the brake cable system. As the tension increases, the load cell 200 senses the load by being compressed by the compressive component and transmits signals to the controls system 128 to monitor the load (tension) in the brake cable system. Once the appropriate tension load is achieved, and the tensioning act is completed (more than one series of tensioning can be accomplished at this stage by controlling the nut runner 122 to increase and decrease tension as desired), the nut runner 122 may be deactivated. During tensioning, the tensioning tool may engage the bracket 116, such as at its front end as shown in FIG. 7, against which to react during the tensioning step. The tensioning tool 120 may be engaged against another fixed or anchor surface whether or not directly in contact with the bracket 116.

Figure 8:
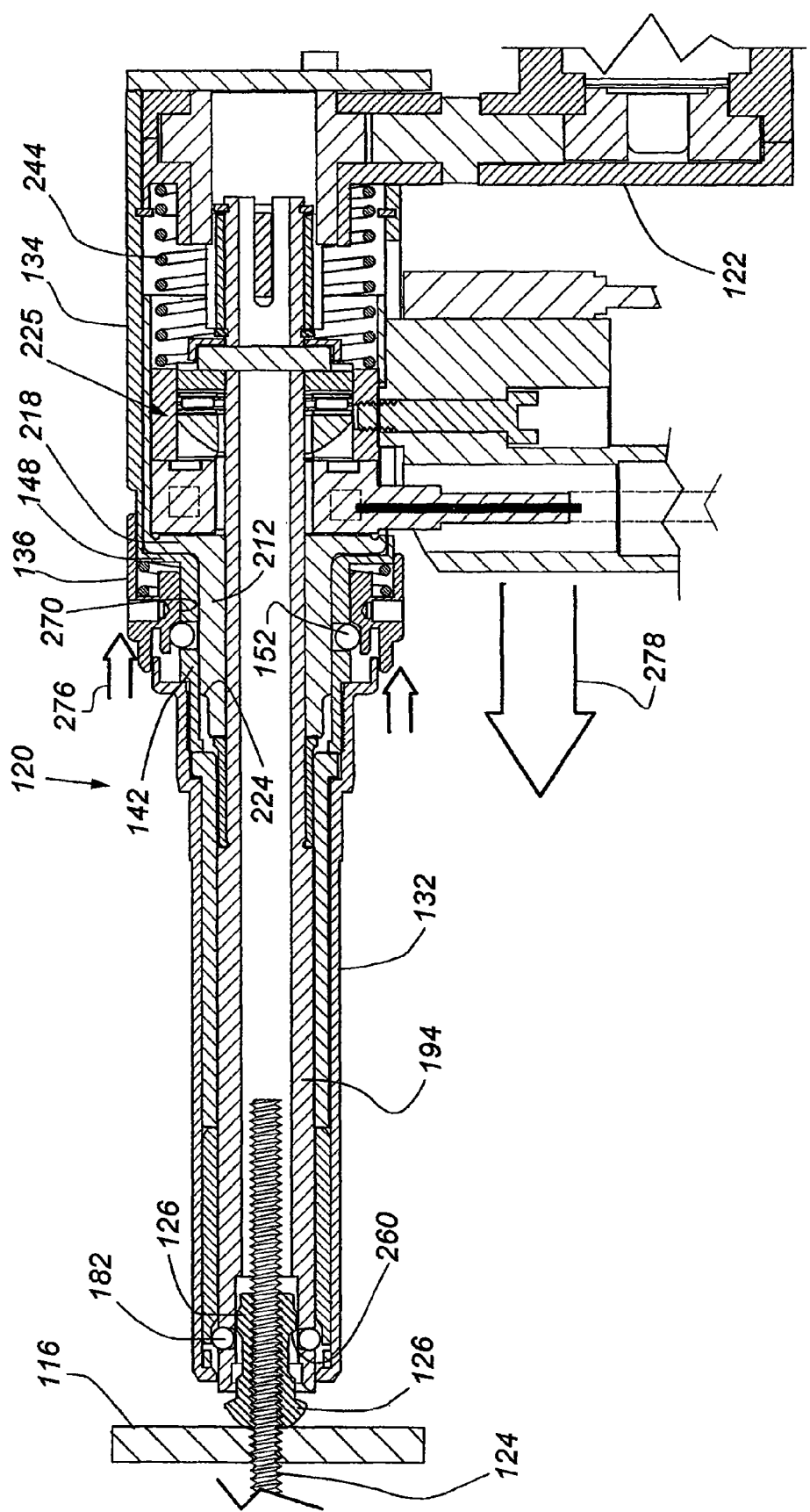
FIG. 8 is a section view similar to that of FIG. 7, but after the nut runner has been actuated to rotate the input shaft to turn the nut up the threaded rod and tension the associated cable system.

After tensioning is complete, the tensioning tool 120 may be released from the nut 126. This is shown in FIG. 8. To release the nut 126 from the tensioning tool 120, the release ring 136 is slid rearwardly (arrow 276) on the first portion 142 of the housing 134. This disengages the inner retaining wall 270 of the release ring 136 from the locking ball 152, and allows the locking ball 152 to move radially outwardly, being urged radially outwardly by the cam surface 224 on the forward portion 212 of the piston. As the locking ball 152 moves radially outwardly, it disengages from the cam surface 224 on the piston 196, and thus allows the piston 196 to move further forwardly in the tool 120, along with the input shaft 194. The piston 196 moves forwardly far enough to cause the outer shoulder 218 of the piston 196 to engage the inner shoulder 148 of the housing 134. This forward movement of the piston 196, if not caused by the tension in the cable system pulling the nut 126 and the input shaft 194 towards the equalizer 116 (typically the tensioning step is performed with the end of the barrel of the tool in engagement with the equalizer), is effected by the return spring 244 pushing the piston 196 forwardly in the housing 134.

As the piston 196 moves forwardly in the housing 134, it pushes the input shaft 194 forwardly also. The input shaft 194 is pushed forwardly far enough to allow the nut engagement balls 182 to release from engagement with the nut 126 (by being forced radially outwardly through the apertures 206 in the forward end of the input shaft 194 by the cam surface at the border of the groove 260 on the nut), thus allowing the nut 126 to be removed from the end effector 138. This is shown in FIG. 8. In the position shown in FIG. 8, once the nut 126 is removed, it is the initialized state as shown in FIG. 5. The tool 120 is ready to be attached to another brake system for the tensioning operation. The arrow 278 in FIG. 8 shows the relative motion of the piston 196, input shaft 194, and piston assembly 154 upon activation of the release ring 136, all relative to the housing 134 and barrel 132.

The method in which the tool 120 is used includes the acts of engaging the nut 126 in the tool 120, causing the nut 126 to be rotationally engaged with the tool 120, causing the tool 120 to be in an orientation facilitating tensioning the brake cable system with a mechanically rigid structure formed by the tool 120 (these last two acts may occur simultaneously, as described herein, or may occur non-simultaneously with one occurring before the other); causing the tool 120 to tension the brake cable system, and causing the tool 120 to release the nut 126 from the tool 120. The nut 126 may be positioned manually in the tool or by an automated machine. The release ring 136 may be operated manually or by an automated machine.

Figure 9A:
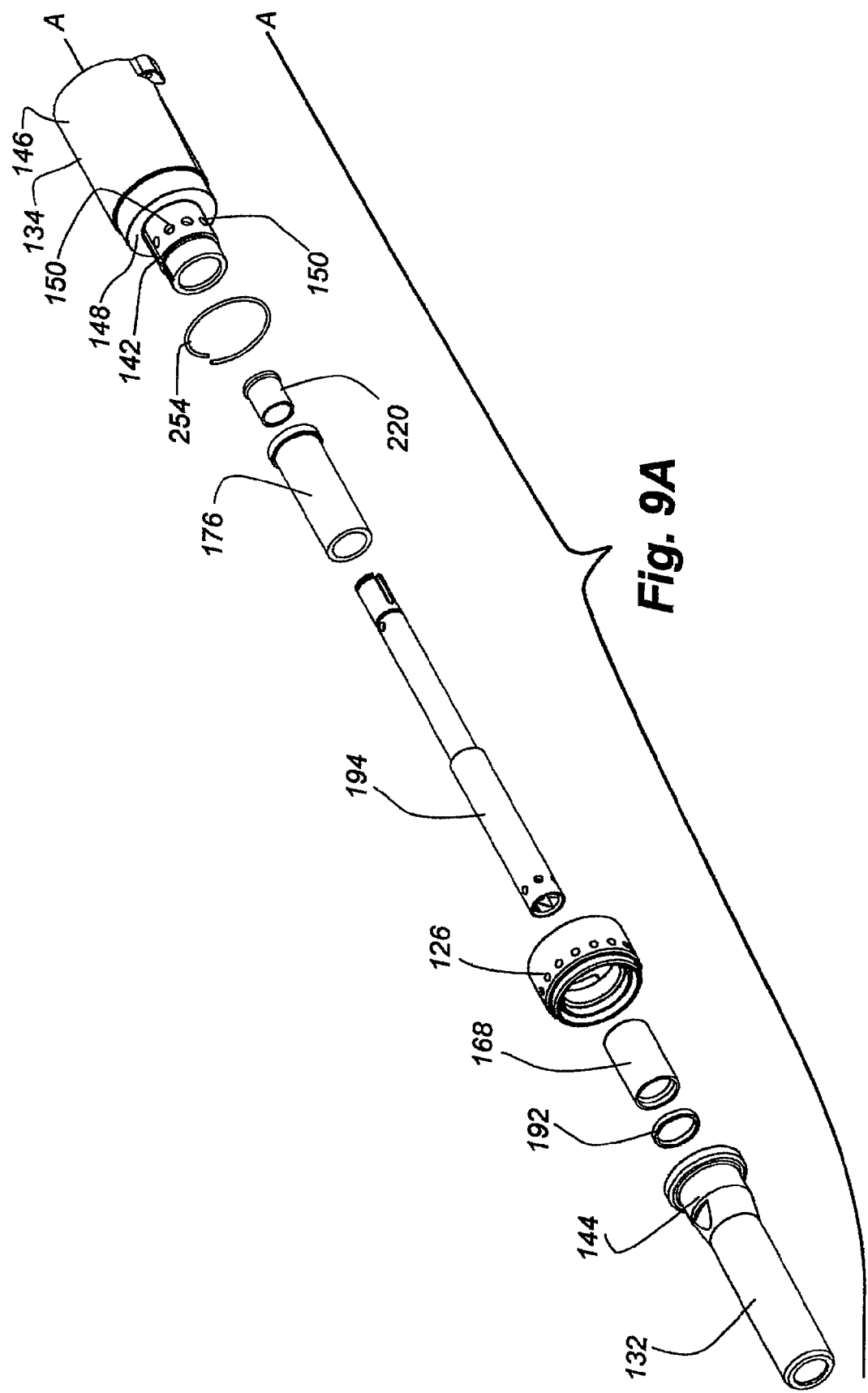
FIGS. 9a and 9b are an exploded view of the inventive tensioning tool showing the components associated therewith as described with respect various figures listed above.
Figure 9B:
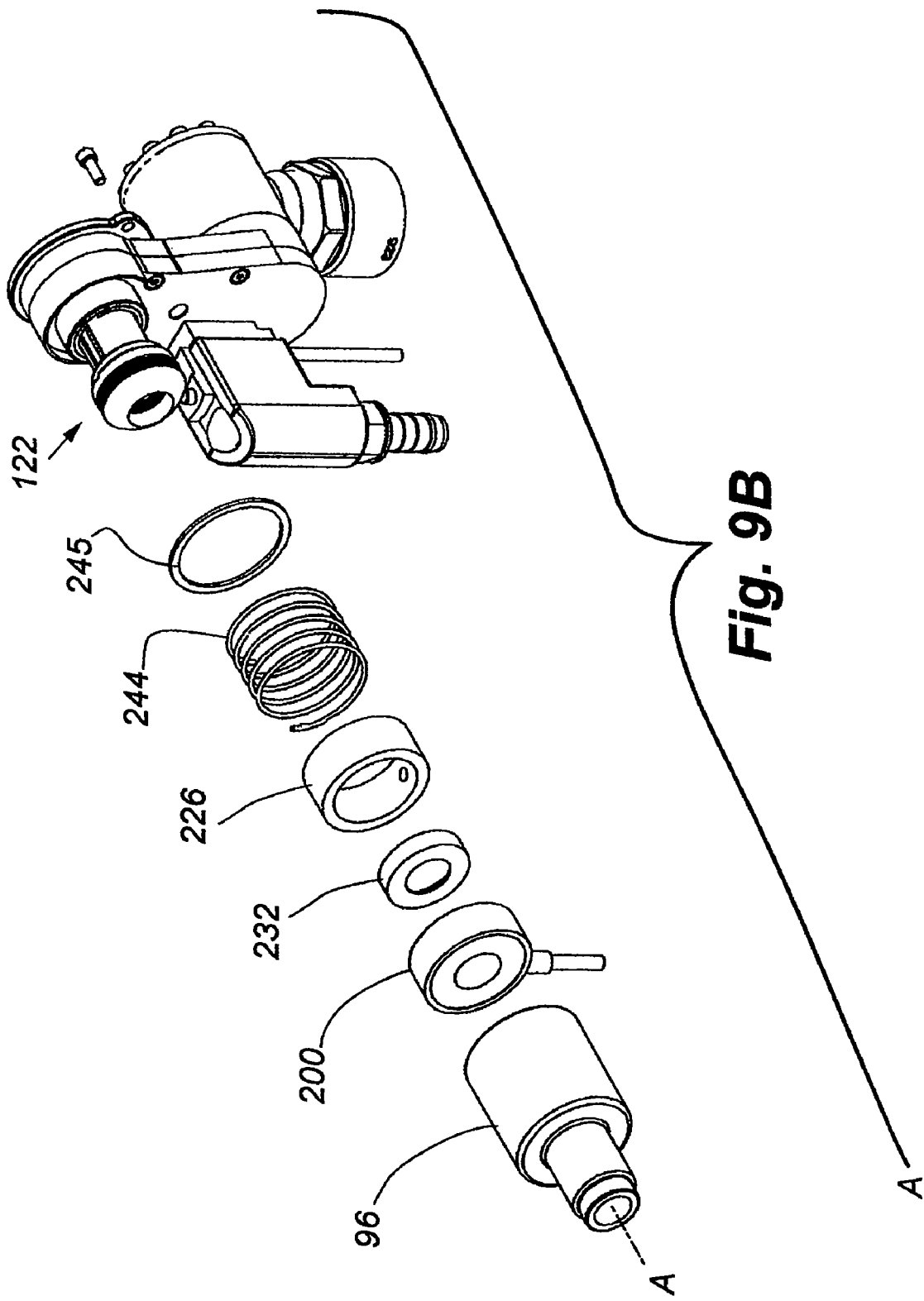

FIGS. 9a and 9b are an exploded view of the brake tensioner shown in FIGS. 5-8. FIG. 9a, with reference to the descriptions of FIGS. 5-8, shows the barrel 132, washer 192, front collar length 168, release ring 136, input shaft 194, rear collar length 176, spacer collar 220, release spring 254, and housing 134. FIG. 9b, as a continuation of FIG. 9a, shows the piston 196, load cell 200, radial collar 232, axial collar 226, return spring 244, snap ring 245, and nut runner 122 with components.

Figure 10:
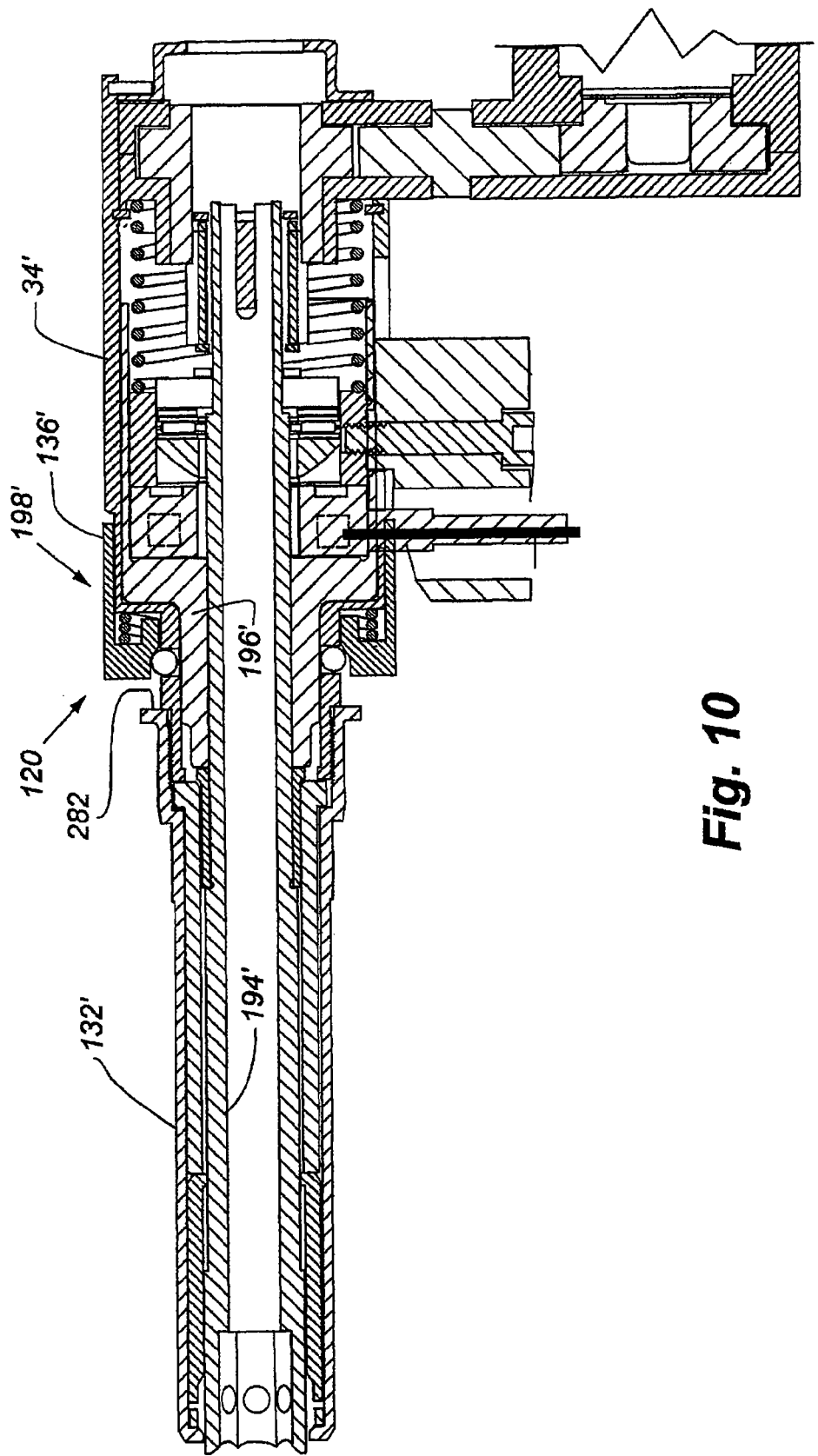
FIG. 10 shows a section view similar to that of FIG. 5, for an alternative embodiment of the invention, where the release ring has a different structure for engaging the barrel in its forward-most position.
Figure 11:
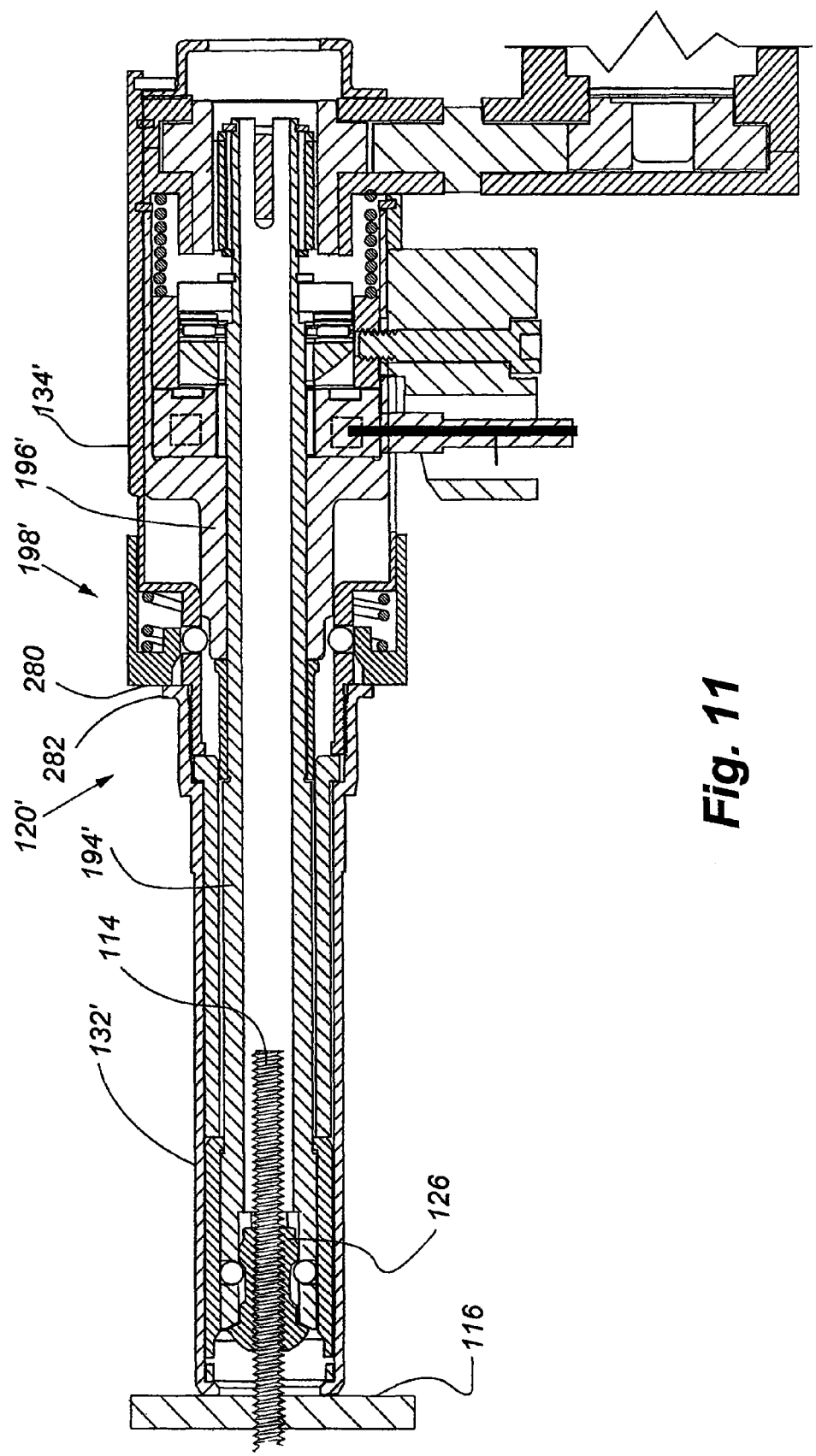
FIG. 11 shows a section view similar to that of FIG. 8, for the alternative embodiment of the invention shown in FIG. 10, with the nut positioned in the end effector and having been run up the threaded rod to tension the associated emergency brake cable system.

FIGS. 10 and 11 show an alternative embodiment of the tensioning tool 120 earlier described, prior to engagement with the nut (FIG. 10) and after the tensioning step, but before disengagement from the nut (FIG. 11). The tool 120 works in much the same way as that described with respect to FIGS. 5-8 above. The barrel 132 and body 134 are rigidly attached together, and the input shaft 194 and piston 196, with its accompanying structure (load cell 200, washers, etc.) are situated in the barrel 132 and housing 134 in order to move relative thereto. The release ring 136 acts to cause the mechanical locking mechanism 198 to actuate, and releases the mechanical locking mechanism 198 similarly to the previous embodiment. The release ring 136, in this example however, does not have a forwardly extending lip, nor does the barrel 132 have a rearwardly extending lip, as the previous embodiment does. Instead, the front edge 280 of the release ring 136 is relatively flat and abuts a flange 282 on the rearward end of the barrel 132 to denote the forward-most extent of the release ring's movement. The engagement of the nut, formation of the rigid column, tensioning, and disengagement of the nut, are all similarly accomplished in this embodiment.

All directional references (e.g., upper, lower, upward, downward, left, right, leftward, rightward, top, bottom, above, below, vertical, horizontal, clockwise, and counterclockwise) are only used for identification purposes to aid the reader's understanding of the examples of the present invention, and do not create limitations, particularly as to the position, orientation, or use of the invention unless specifically set forth in the claims. Joinder references (e.g., attached, coupled, connected, joined, and the like) are to be construed broadly and may include intermediate members between a connection of elements and relative movement between elements. As such, joined references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. Changes in detail or structure may be made without departing from the spirit of the invention as defined in the appended claims. Accordingly the matter contained in the above description or shown in the accompanying drawings shall be interpreted as illustrative only and not limiting.

What is claimed is:

1. A tensioning tool for use in tensioning an emergency brake cable system for a vehicle, the tensioning tool being driven by a rotational driver, and the emergency brake cable system including a cable end, the tensioning tool comprising:
   a main body;
   a plurality of components movably positioned in said main body to move between a first position and a second position and configured to selectively receive and engage the cable end;
   a bias member associated with the plurality of components and configured to bias the plurality of components to the first position;
   a first locking mechanism associated with the plurality of components and selectively actuable between a locked and unlocked engagement with the plurality of components;
   a release mechanism associated with said main body and the first locking mechanism, said release mechanism actuable to unlock said first locking mechanism from said plurality of components by moving the release mechanism relative to the main body; and
   the main body, the plurality of components, the bias member, the first locking mechanism and the release mechanism are configured such that:
   when the plurality of components are moved from the first position to the second position, the first locking mechanism actuates into locked engagement with the plurality of components to prevent the plurality of components from moving from the second position to the first position; and
   when the plurality of components are positioned at the second position and the release mechanism is actuated to unlock the first locking mechanism from the plurality of components by moving the release mechanism relative to the main body, the bias member moves the plurality of components from the second position to the first position.

2. A tensioning tool as defined in claim 1, further comprising:
   said main body including a barrel portion;
   said plurality of components including an input shaft positioned inside said barrel portion and being movable relative thereto between said first position and said second position;
   said plurality of components including a piston assembly positioned inside said main body and operably associated with said input shaft, and being movable relative to said main body between said first position and said second position;
   said locking mechanism mounted on said body and operably engageable with said piston assembly to hold said piston assembly in said second position when actuated and to allow said piston assembly to return to said first position upon deactuation;
   and
   wherein insertion of said cable end into said input shaft and movement of said input shaft into said barrel to said second position moves said piston assembly into said second position and actuates said locking mechanism to hold said piston assembly in an axial position relative to said barrel, and actuation of said release mechanism deactuates said locking mechanism and allows said input shaft and said piston assembly to return to said first position.

3. A tensioning tool as defined in claim 2, wherein said main body and said piston assembly become a rigid mechanical column upon actuation of said locking mechanism in said second position.

4. A tensioning tool as defined in claim 2, wherein said input shaft may rotate relative to said piston assembly and said main body, and apply a tension load from the cable system to said piston assembly.

5. The tensioning tool of claim 1 further comprising:
   a second locking mechanism associated with the plurality of components; and
   the main body, the plurality of components and the second locking mechanism are configured such that when the cable end is received within the plurality of components, the second locking mechanism engages the cable end as the plurality of components moves from the first position to the second position to engage the cable end with the plurality of the components and releases from engagement with the cable end as the plurality of components moves from the second position to the first position to allow release of the cable end from the plurality of components.

6. An apparatus for use in tensioning an emergency brake cable system for a vehicle, the apparatus being driven by a rotational driver, and the brake system including a rotatable cable end, the apparatus comprising:
   a main body defining a cavity;
   a rotatable portion positioned within the cavity of the main body and rotatably movable and axially movable relative to the main body and adapted to receive the cable end,
   a tension measuring device positioned within cavity of the main body and operably associated with the rotatable portion, and
   a first moving portion and a second moving portion, each of said first and second moving portions moving axially relative to the main body, the first moving portion positioned substantially external to the main body and the second moving portion positioned within the cavity of the main body;
   said first and second moving portions having a first position wherein the cable end is movable relative to the rotatable portion; and a second position wherein said cable end is rotationally fixed relative to the rotatable portion; and
   wherein movement of the first movable portion from the second position to the first position causes said second movable portion to move to the first position and release said cable end.

7. An apparatus as defined in claim 6, wherein:
   said first and second moving portions are held in said first position by a locking mechanism being in a first position; and said first and second moving portions are held in said second position by said locking mechanism being in a second position.

8. An apparatus as defined in claim 7, wherein:
said locking mechanism includes at least one locking ball selectively interfering with said first and second moving portions.

9. An apparatus as defined in claim 7, wherein:
said tension measuring device is disposed at least in part between said second moving portion and said rotatable portion to measure a tension load applied to said rotatable portion.

10. An apparatus as defined in claim 9, wherein:
said tension measuring device is a load cell under compression between said second moving portion and said rotatable portion.

11. An apparatus as defined in claim 10, wherein:
said load cell is positioned annularly about said rotatable portion and measures the tension along the direction in which the load is applied.

* * * * *